United States Patent
Huiberts

[11] Patent Number: 5,869,758
[45] Date of Patent: Feb. 9, 1999

[54] METHOD AND APPARATUS FOR MEASURING THE FLOW RATE OF A MEDIUM FLOW

[75] Inventor: Albertus Theodorus Huiberts, Amsterdam, Netherlands

[73] Assignee: GAScontrol b.v., Amsterdam, Netherlands

[21] Appl. No.: 428,237

[22] PCT Filed: Oct. 29, 1993

[86] PCT No.: PCT/NL93/00222

§ 371 Date: May 2, 1995

§ 102(e) Date: May 2, 1995

[87] PCT Pub. No.: WO94/10540

PCT Pub. Date: May 11, 1995

[30] Foreign Application Priority Data

Nov. 2, 1992 [NL] Netherlands ............................ 9201906

[51] Int. Cl.[6] ..................................................... G01F 7/00
[52] U.S. Cl. ........................................... 73/197; 73/204.11
[58] Field of Search ................................. 73/197, 204.11, 73/204.12, 204.13, 204.14, 204.15, 204.23, 204.25

[56] References Cited

U.S. PATENT DOCUMENTS

| | | | |
|---|---|---|---|
| 4,483,200 | 11/1984 | Togawa et al. | 73/204.25 |
| 4,653,321 | 3/1987 | Cunningham | 73/197 |
| 4,770,037 | 9/1988 | Noir et al. | 73/204.11 |
| 4,821,568 | 4/1989 | Kiske . | |
| 4,969,357 | 11/1990 | Mickler | 73/204.11 |
| 5,460,040 | 10/1995 | Tada et al. | 73/204.25 |

FOREIGN PATENT DOCUMENTS

| | | |
|---|---|---|
| 0269823 | 6/1988 | European Pat. Off. . |
| 0330233 | 2/1989 | European Pat. Off. . |
| 0403142 | 6/1990 | European Pat. Off. . |
| 2141312 | 1/1973 | France . |
| 1523251 | 4/1969 | Germany . |
| 3210888 | 9/1983 | Germany . |
| 1397113 | 6/1975 | United Kingdom . |
| 8300227 | 1/1983 | WIPO . |

OTHER PUBLICATIONS

Jan. 1984 NTS Tech. Notes.

*Primary Examiner*—Richard Chilcot
*Assistant Examiner*—Jewel V. Artis
*Attorney, Agent, or Firm*—Edmund M. Jaskiewicz

[57] ABSTRACT

The flow rate of a medium flowing through a channel is measured by using a number of measurement sites along which the medium flows continuously at different velocities. The heating of the medium at the measurement site and the measurements of the temperature changes at the measurement sites are used to measure the rate of flow. Calibration information for the flow measurement for each measurement site is utilized to establish a rule which would include information about the measurement accuracy over the measurement range for each measurement site. The flow rate to be measured is established upon the basis of the measurement result of a measurement site which gives the greatest measurement accuracy according to the predetermined rule. The measurement of the flow at a measurement site comprises heating the medium during a first interval and during a second interval subsequent to the firest interval the temperature reduction is monitored at the measurement site. The flow rate is established on the basis of the temperature reduction.

17 Claims, 7 Drawing Sheets

METHOD AND APPARATUS FOR MEASURING THE FLOW RATE OF A MEDIUM FLOW

FIELD OF THE INVENTION

The present invention relates to the measurement of the flow rate of a medium flowing through a channel, more particularly, to a method and apparatus for measuring flow rate utilizing a number of measurement sites in the channel and measuring the temperature of the liquid at the measurement site to determine the flow rate based on a predetermined rule.

DESCRIPTION OF THE PRIOR ART

A method of the above mentioned type is disclosed by EP-A-0269823. This prior art document does not disclose the type of sensor or detection means used. The detection means is connected in a voltage divider. During second periods a measuring current is fed through the whole voltage divider and from a node of the voltage divider a signal is derived which represents an electrical parameter which is dependent on the temperature of the detection means. This signal is supplied to a number of comparators, which each receive in addition a different threshold voltage. The threshold voltages are selected in advance such that they are related in a specific manner according to one or more equations, a number of which being dependent on the number of comparators, and dependent on a supposed exponential development of the cooling of the detection means. Starting at the beginning of each second period each comparator will therefore provide a pulse and the pulses from the comparators will have different durations. From the times between trailing edges of said pulses, which times each correspond to a specific temperature of the detection means, a flow rate value is determined. Though the document discloses the use of several detection means with identical or different characteristics, the document does not disclose anything about the locations of the detection means and nothing about the flow characteristics at said locations.

DE-A-3210888 discloses a method for measuring the flow rate of a medium, which includes the use of a flow channel having measurement sites with different flow velocities for any flow rate at a time. At each measurement site a heat supply member is arranged and a small distance downstream therefrom a temperature sensor is arranged. The heat supply members are suitable to transfer heat from it to the medium in response to an electric current pulse received from a pulse generator. The time which elapses between feeding a heating current pulse to a heat supply member of a measuring site and the receiving of a measurement signal from the temperature sensor of the site is a measure used for determining a flow rate value. The different measurement sites with different flow velocities are used to select a measurement of the flow rate with the highest accuracy.

US-A-4653321 discloses a method for measuring the flow rate of a medium including the use of at least two flow channels of different sizes, each containing a thermally sensitive resistance element, such as a thermistor. Each flow channel is provided with an orifice which is important for accurate correlation and measurement because the orifice reduces the sensitivity of the calibration of the system to variances in the system. The temperature sensor in each channel is positioned just downstream of the orifice. Some flow channels are provided with valves which are electrically connected to and operated by an electronic controller. The output of a sensor is supplied to an associated bridge circuit, which then supply the electronic controller with the desired flow rate information or with electrical information from which that information can be calculated by the electronic controller. Dependent on the flow rate the electronic controller opens or closes one or more of the valves to provide a wide measurement range of flow rates. Each bridge is connected to a differential amplifier, of which the output is connected to a supply node of the bridge thus providing feed back to the bridge. The sensor continuously receives an electrical current from the output of the amplifier. Said current is dependent on the temperature of the sensor, which temperature is dependent on the flow rate in the associated subchannel. Though the document discloses the use of flow channels of different sizes, it does not disclose such a design of the subchannels and orifices that the medium flows with different velocities at the different measurement sites. In addition each prior art subchannel defines several measurement ranges, individually or dependent on which of the other subchannels are open or closed. Still in addition, a velocity of the medium flowing through a subchannel can occur for several total flow rates, dependent on which of the other subchannels are open or closed.

The prior art methods do not take into account the fact that during heating of a detection means, or sensor, heat will drain to connecting wires of the detection means and to the housing in which the detection means is fitted, and that during a cooling period heat will flow back from said housing and said wires to the detection means, which affects the accuracy of the measurement with said detection means.

SUMMARY OF THE INVENTION

It is an object of the invention to provide a method for measuring the flow rate of a medium with a higher accuracy then with the prior art methods and suitable for application with an apparatus having stationary components only.

The object of the present invention is achieved by measuring the temperature of the flowing medium at a number of measurement sites along the channel in which the medium is flowing and then determining the flow rate on the basis of these temperatured measurements and according to a predetermined rule in which calibration information has been processed.

Since for each first period the heating of a detection means takes place over a fixed duration and with substantially identical development curves, substantially identical heating end temperatures at the end of all first intervals are obtained, during all first periods substantially the same amount of heat will drain from the detection means to, for example, connecting wires and to a housing, and during subsequent second periods substantially the same amount of heat will flow back to the detection means. Therefore the measurement accuracy is very little affected by any such drain and flowing back of heat.

According to the method of the present invention, flow measurement is carried out for a group of measurement sites which comprises the measurement site with which the last-established end measurement temperature of the flow rate has been established as well as two measurement sites with neighboring higher and lower flow velocities of the medium.

By this characteristic a reference development curve of the electrical parameter, which is dependent on the temperature of the detection means, can be approximated very accurately.

BRIEF DESCRIPTION OF THE DRAWING

Further characteristics and advantages of the invention will become apparent from the description of embodiments of the invention given hereinbelow with reference to the appended drawings, in which.

In the figures, where applicable, a flow $\Phi$ or $\phi$ of a medium, which may be a gas or a liquid, is indicated with an arrow which shows the direction of the flow and which is also shown with the symbol $\Phi$ or $\phi$, respectively.

DESCRIPTION OF THE PREFERRED EMBODIMENTS

Figure 1:
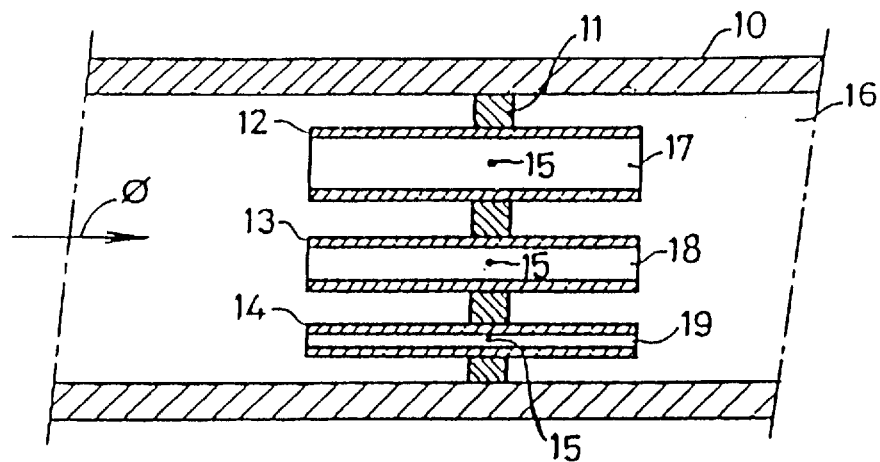
FIG. 1 shows a cross section of a measuring assembly for the passage of a flow medium to be measured.

FIG. 1 shows an assembly of a main pipe 10, a partition 11 fitted in a leaktight manner against the inner wall of the pipe 10, the partition 11 having perforations through which a number of pipes, such as the pipes 12, 13, 14, penetrate in parallel with the main pipe 10 in a leaktight manner. The circulation areas, or cross area of the bores, of the pipes 12, 13 and 14 are $A_1$, $A_2$ and $A_3$ respectively, for which $A_1 > A_2 > A_3$ is valid. The sum of these areas is presented by $\Sigma A = A_1 + A_2 + A_3$.

In each pipe, at a measurement site, there is fitted a detection means 15, which, for the sake of simplicity of the drawing, is shown only by a dot, and of which the electrical wires connecting to external electrical means not being shown. For simplicity of the description, it is assumed that the detection means 15 is small compared with the smallest circulation area of the pipes 12, 13 and 14 and essentially forms no obstruction for the flow in the relevant pipe and, if appropriate, is fitted in the inner wall of the pipe.

The main pipe 10 forms a main channel 16 through which the flow medium $\Phi$ is conveyed. The pipes 12, 13 and 14 form subchannels 17, 18 and 19, respectively, between which the flow $\Phi$ is divided into $\phi_1$, $\phi_2$ and $\phi_3$, respectively.

The detection means 15 is located in the relevant flow medium $\phi_1$ in each channel 12, 13, 14.

As explained below in the case of an embodiment of the invention, the detection means 15 may comprise a heating member and a temperature sensor, the temperature sensor being temporarily heated periodically by the heating member, after which the temperature change, measured by the temperature sensor, in this case a cooling, to the temperature of the incoming flow $\phi_1$, is monitored and after which, on the basis hereof, a value is established for the flow rate of the flow $\Phi$.

The flow rate of a flow through a pipe i of the pipes 12, 13 and 14 may be established by:

$$\phi_i = \frac{A_i}{\Sigma A} \Phi \quad (1)$$

The flow rate $\phi_i$ through a pipe i will thus be smaller, the smaller the circulation area $A_i$ of the pipe i. It is to be expected that as the flow rate $\phi_i$ of the pipe i is smaller, the cooling of the temperature sensor of the pipe i takes place more slowly than in a pipe j with a larger circulation area $A_j$ for the same total flow rate $\Phi$. If the detection means 15 of the different pipes 12, 13 and 14 are principally identical, this does not hold true or, as will become further apparent, does not hold completely true, since the temperature sensor of each detection means 15 will essentially be immersed in, on average, the same amount of medium per time unit. This can be derived from the fact that the velocity of the medium in a pipe i is equal to:

$$v_i = \frac{\phi_i}{A_i} \quad (2)$$

And, after completion of formula (1):

$$v_i = \frac{\Phi}{\Sigma A} = v_m \quad (3)$$

where $v_m$ is the average velocity of the medium in both the main pipe 10 and in the pipes 12, 13 and 14.

As a result of this, with the above-mentioned hypothesis regarding the detection means 15, the same amount of medium per time unit will flow along each detection means 15 in each pipe 12, 13, 14. This is also valid for the case in which the flow is turbulent in the vicinity of the detection means 15. Since it continues to hold true that the amount of medium flowing into a pipe also flows out again, the result of turbulence will be that the average velocity $v_m$ is indeed also valid in the long run, but that, in the meantime, the velocity varies and, for this reason, accurate measurement of a temperature development curve of the temperature sensor in practice becomes more difficult.

Since, in the case of FIG. 1, with the above-mentioned hypothesis in respect of the dimensions and/or location of a detection means 15 in a pipe, the average velocity $v_m$ for both the main pipe 10 and for the pipes 12, 13 and 14 is theoretically identical, it appears, also, again, in theory, to be unimportant which detection means 15 is used to establish the flow rate and the assembly of the partition 11 and the pipes 12, 13 and 14, with the detection means 15 therein, could be replaced by a single detection means 15 in the main pipe 10. In practice, this has proved unsuitable for accurate measurement, with a rapid response, of the flow rate $\Phi$ over a large range.

As an example, reference may be made to the measurement of a quantity of natural gas used by a household within a range of 0.02–10 m³/h, wherein the flow rate can be measured not only sufficiently accurately but also sufficiently dynamically in relation to a possibly considerably varying use by a water-heating device which, for example, is switched on for a short time or in a modulating manner.

In practice, however, the situation will be different from the theoretical situation explained hereinabove in the case of FIG. 1. Owing to the occurrence of friction forces between the inner wall of the pipes 12, 13 and 14 and the medium flowing along them, the velocity of the medium in each pipe i will actually not be uniformly divided. In addition, the smaller the circulation area $A_i$ of the pipe, the greater the influence the friction will have on the average velocity of the medium in the pipe i. consequently, for each flow rate Φ, at different measurement sites each having a detection means 15 may still occur, as a result of which, in the case of each determined flow rate Φ, the temperature sensors of the different detection means 15 of the pipes 12, 13 and 14 cool down with different rates. According to the invention, the cooling curves of the different detection means 15 may be measured at all times, if desired slopes or time constants may be established on the basis of this, and by using a predetermined rule a cooling curve can be chosen with which the total flow rate Φ can be established with sufficient accuracy. The predetermined rule comprises a decision algorithm and is, in particular, represented by a program of data-processing means, parameters of the rule or the algorithm being established in advance in a calibration phase. In the calibration phase, relevant characteristics and a measuring accuracy of the cooling curves of the different detection means 15 can be stored for a number of known values of the total flow rate Φ. After calibration, the relevant total flow rate for each measured cooling curve can be obtained with sufficient accuracy on the basis of this, an interpolation for a flow rate Φ between two neighbouring values of Φ possibly being performed.

Owing to calibration, it is not necessary to know the distribution of the velocity of the medium inside each tube i. The velocity of the medium inside a tube i is, however, as mentioned, dependent on the friction with the inner wall of the tube. Since the friction coefficient of the inner wall can change in the course of time, the measurements of the flow rate Φ may become less reliable.

Figure 2:
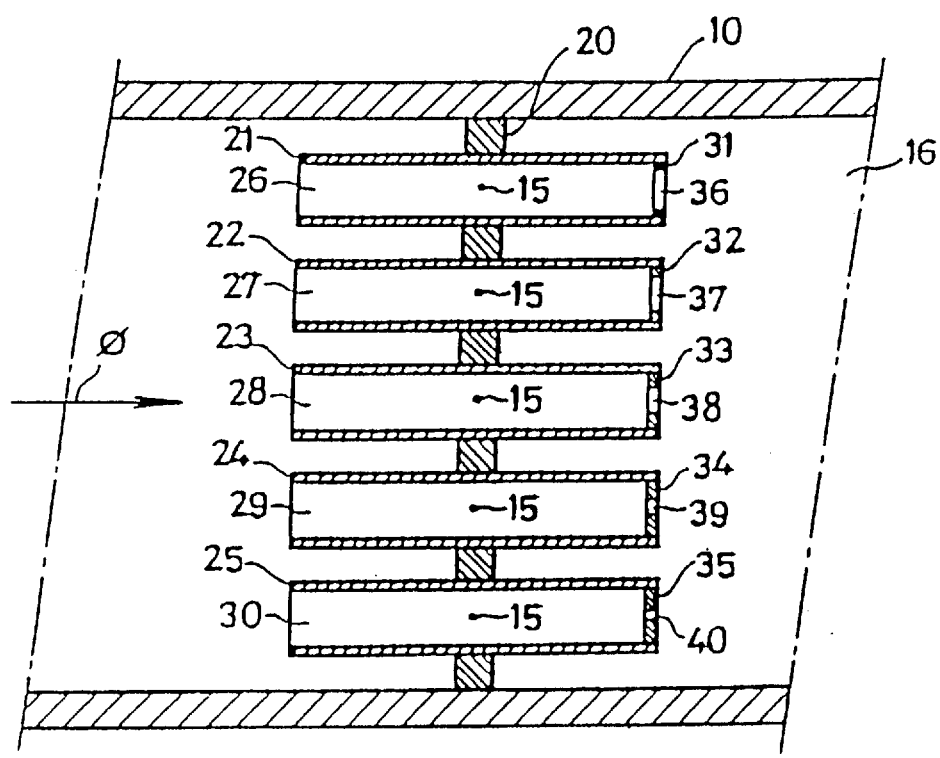
FIG. 2 shows a further embodiment of an assembly of the type shown in FIG. 1.

In order to counteract the disadvantages resulting from the above-mentioned friction, pipes with a relatively large circulation area are preferably used and a desired distribution of the velocity of the medium in the different pipes is brought about through the use of a restriction in each pipe. FIG. 2 shows a cross section of an assembly, of the type in FIG. 1, in which this is used.

FIG. 2 shows a main pipe 10 in which a radial partition is fitted in a leaktight manner. The partition 20 has perforations in which a number of pipes, such as the five pipes 21 to 25 inclusive, are fitted in parallel with the main pipe 10 in a leaktight manner. In each pipe 21 to 25 inclusive is a detection means 15 which may be of the type already described with reference to FIG. 1. The main pipe 10 again forms the main channel 16 for the medium and the pipes 21 to 25 inclusive form channels 26 to 30 inclusive, respectively. Although not provided with separate reference numbers, each channel has an inlet (on the left-hand side in FIG. 2) and an outlet (on the right-hand side in FIG. 2). At a distance from their inlet, and, in FIG. 2, near their outlet, the pipes 21 to 25 inclusive have a restriction 31 to 35 inclusive, respectively, with a passage 36 to 40 inclusive, respectively. As will become apparent below, one of the pipes, for example pipe 21, may be constructed without the restriction 31, although this pipe will be used as if it had the restriction 31. Furthermore, more or fewer pipes with or without a restriction and with or without a detection means, such as the detection means 15, may be fitted in the partition 20. For the simplicity of the description, it will be assumed hereafter that each of the pipes 21 to 25 inclusive has a restriction 31 to 35 inclusive, respectively.

The assembly of the main pipe 10, the partition 11 or 20 with the pipes 12, 13 or 14 or the pipes 21 to 25 inclusive with the restrictions 31 to 35 inclusive may be a single unit integrally formed by means, for example, of injection moulding. By applying the calibration stage when using such an assembly, the tolerances thereof are allowed to be relatively large. As a result of this, the assemblies shown in FIG. 1 and FIG. 2 can be manufactured relatively cheaply.

The partition 20 of the assembly of FIG. 2 and the detection means 15 thereof are located at a distance from the inlets of the pipes 21 to 25 inclusive so that any turbulence of the medium in the vicinity of each detection means 15 is relatively small, as a result of which the occurrence of the above-mentioned disadvantages in respect of turbulence are counteracted, and the velocity of the medium in the vicinity of a detection means 15 is essentially identical to the average velocity of the medium in the relevant pipe 21 to 25 inclusive.

The passages 36 to 40 inclusive of the respective restrictions 31 to 35 inclusive are assumed to have circulation areas $A_1$ to $A_5$ inclusive, respectively. The flow rate $\Phi_1$ and the velocity $v_i$ of the medium in a passage 36 to 40 inclusive are then given by the above-mentioned formulae (1) and (2), respectively.

It is now assumed that the pipes 21 to 25 inclusive have circulation areas $A'_1$ to $A'_5$ inclusive, respectively. The average velocity $v'_i$ in a pipe i is then:

$$v'_i = \frac{\phi_i}{A'_i}$$

and, after substitution of $\phi_i$ according to formula (1):

$$v'_i = \frac{A_i}{A'_i} \cdot \frac{\Phi}{\Sigma A}$$

and, after substitution by $v_m$ according to formula (3):

$$v'_i = \frac{A_i}{A'_i} \cdot v_m \quad (4)$$
$$v'_i = C_i v_m$$

wherein $C_i$ is a constant relating to the pipe i which gives the ratio of the circulation area $A_i$ of the passage of the restriction of the pipe i and of the circulation area of the pipe i. It thus appears that the average velocity $v'_i$ of the medium in a pipe is lower, the lower the constant $C_i$, for example the smaller the circulation area $A_i$ of the relevant passage of the restriction and/or the larger the circulation area $A'_i$ of the pipe i. Consequently, the constant $C_i$ can be predetermined in different ways. The fact that the pipes 21 to 25 inclusive in FIG. 2 appear to nave the same diameter must therefore be regarded only as an example.

The velocity of the medium inside a pipe 21 to 25 inclusive of the assembly of FIG. 2 thus depends on and can be predetermined by a suitable choice of two circulation areas thereof, namely of the passage of the restriction thereof and of the pipe itself. As a result of this, when designing the assembly of FIG. 2, a large variety of velocities of the medium in the different pipes 21 to 25 inclusive can be allocated in a simpler manner and with greater accuracy than in the situation of FIG. 1 for which, in theory, it holds true that the constant $C_i$ for all the pipes 12, 13 and 14 is identical. As a result of this, it will be possible to design the assembly of FIG. 2 with a better predetermined definition. Since, in the assembly of FIG. 2, pipes 21 to 25 inclusive with relatively large circulation areas can be used, the measurement of the flow rate Φ depends less on the friction coefficient of the material of the pipes during the calibration and for a long time thereafter, and the risk of blockage of the pipes is lower than in the assembly of FIG. 1.

It will be obvious that, in reality, the average velocity $v'_i$ of the medium in a pipe i of the theoretical value according to formula (4) can vary. However, this is not of essential importance for the explanation of the invention. By also applying a calibration stage in the case of the assembly of FIG. 2, a difference between the actual average velocity and the theoretical average velocity of the medium in a pipe will not constitute any problem.

Since, according to formula (4), the medium in the pipes 21 to 25 inclusive has different average velocities, a temperature sensor of the detection means 15 of a pipe i will cool down more slowly as the velocity of the medium in that pipe i is smaller. As the total flow rate Φ decreases, the velocity $v'_i$ in the same pipe i will, however, also decrease and can even reach such a low value that it can no longer be used to measure accurately a temperature development curve of a temperature sensor of the detection means 15. In that case, the measurement must be made with a detection means 15 of a pipe in which the velocity of the medium is indeed sufficiently large to be able accurately to measure the temperature development curve of the last-mentioned detection means 15. In the case of the smallest flow rate permitting sufficiently accurate measurement, use will therefore be made of the detection means 15 of a pipe i with the greatest constant $C_i$, thus, in the case of FIG. 2, of the detection means 15 of the pipe 21.

Conversely, as the total flow rate Φ increases, the average velocity $v'_i$ of the medium in a pipe i will increase, as a result of which a heated-up temperature sensor of the detection means 15 of the pipe i cools down more quickly. This can occur to such an extent that the temperature development curve to be measured by the temperature sensor is too steep for it to be measured sufficiently accurately. In that case, the measurement will have to be made with the detection means 15 of a pipe in which the velocity of the medium is lower, thus a pipe with a smaller constant $C_i$. In order to measure the largest measurable flow rate Φ, use will therefore be made of the detection means 15 of the pipe with the smallest constant $C_i$, thus, in the case of FIG. 2, of the detection means 15 of the pipe 25.

Figure 3:
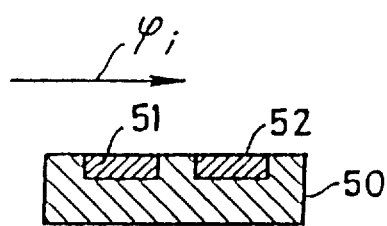
FIG. 3 shows a cross section of an embodiment of a detection means for use in the assembly of FIG. 1 or FIG. 2.

As mentioned, the detection means 15 can consist of a heating member and a temperature sensor which is periodically and temporarily heated by the heating member. Heating-up of the temperature sensor can therefore take place markedly more quickly than cooling thereof. A detection means 15 of this type can have a configuration such as that shown in FIG. 3, which consists of a substrate 50 of heat-conducting material with a heating member 51 and a temperature sensor 52 in it (or on it). The heating member 51 is, for example, as known per se, a resistor, a diode or a transistor. The temperature sensor 52 is, for example, as known per se, a resistor, particularly a thermistor (NTC or PTC), a diode or a transistor. The resistor can, for example, be a tungsten wire. Since the heating member 51 and the temperature sensor 52 are each activated or used in a separate time interval, use can also be made, for the detection means 15, of a single member, such as a resistor, in particular a thermistor, a diode or a transistor. It generally holds true that the temperature sensor of the detection means 15, after heating thereof with a constant total flow rate Φ at a high temperature $T_h$, to which it is heated, will gradually decrease, according to an exponential law, to a lower temperature $T_a$ which is equal to the temperature of the medium at the inlet of the relevant channel. The low temperature $T_a$ could also be termed ambient temperature or heating start temperature. The high temperature $T_h$ could also be termed heating end temperature or measurement start temperature.

The temperature development curve (cooling) $T_{i,j}(t)$ of a temperature sensor of the above-mentioned type of a detection means 15 of a pipe i at a constant total flow rate $\phi_j$ through the main channel 16 can then be represented by the equation:

$$T_{i,j}(t)=T_a+(T_h-T_a)e^{-t/\tau_{i,j}} \qquad (5)$$

Here, $\tau_{i,j}$ is a time constant belonging to a specific pipe i (21 to 25 inclusive) for a certain total flow rate $\Phi_j$. As more medium flows along the temperature sensor per time unit, in other words, as the velocity of the medium in the pipe i is greater, the temperature sensor will cool down more quickly and the time constant will be smaller.

Figure 4:
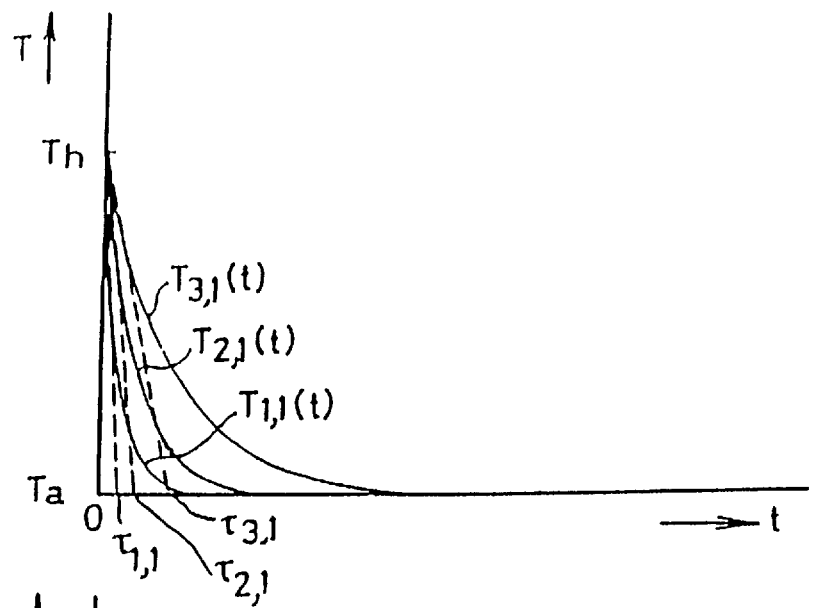
FIGS. 4, 5 and 6 show time diagrams, with the same time scale, of cooling curves of temperature sensors in the assembly according to FIG. 1 or FIG. 2.
Figure 5:
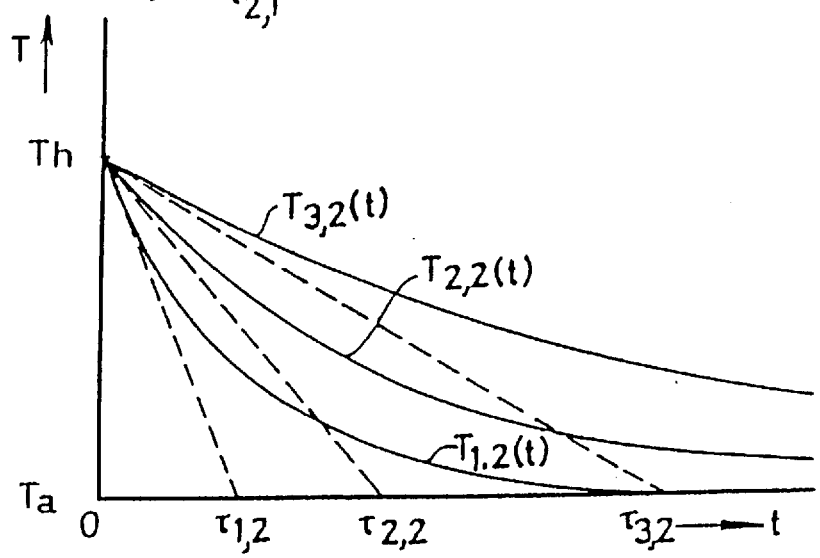
Figure 6:
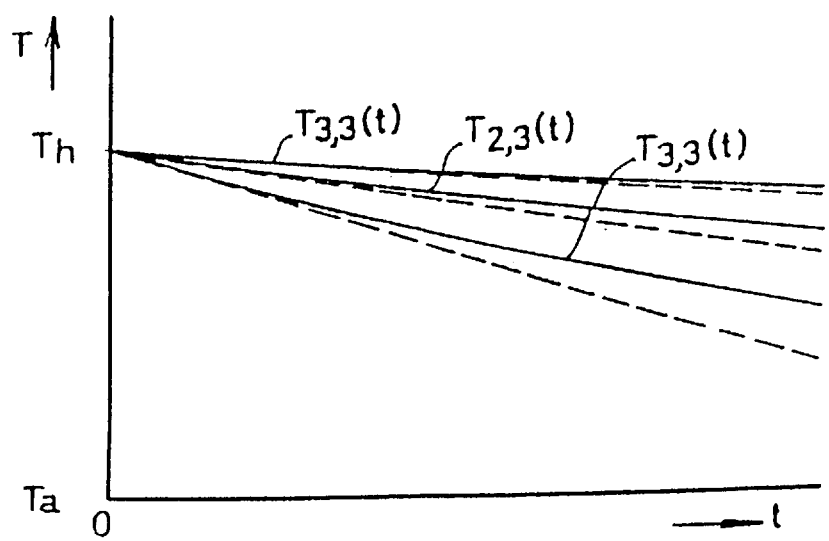

FIGS. 4, 5 and 6 show, each on the same scale, the temperature development curve of three temperature sensors of three pipes with i=1, 2, 3, for example the pipes 22, 23, 24, respectively, at a specific total flow rate $\Phi_j$ with j=1, 2, 3. In the case of FIGS. 4, 5, 6, respectively, with $\Phi_1 > \Phi_2 > \Phi_3$.

FIGS. 4 to 6 inclusive show that as the total flow rate becomes greater, the curves $T_{i,j}(t)$ for all three pipes 22, 23 and 24 will become steeper. On the other hand, if the total flow rate Φ becomes smaller, the relevant curves $T_{i,j}(t)$ for all three pipes 22, 23 and 24 will be flatter.

Although, in theory, the curves are not linear at any point, start portions thereof are approximately linear with a slope which is determined by the time constant $\tau_{i,j}$. For this reason, as mentioned above, during a calibration phase for different values of the total flow rate Φ for each pipe i, it is possible to allocate the relevant value of the total flow rate Φ to the slope or time constant, observed at that time, of the cooling curve. Subsequently, a table can be established with a number of pairs of values for each pipe i, each pair consisting of a value which indicates a slope or the time constant of the cooling curve and a value of the relevant total flow rate.

It will be obvious that as one of the said slopes is steeper, thus as the velocity of the medium in the relevant pipe is greater, the temperature development curve can be measured less accurately at instants with identical intervals. For example: in the virtually linear portion of the curve $T_{1,1}(t)$ in FIG. 4, far fewer temperature samples can be taken than in the virtually linear portion of the curve $T_{3,3}(t)$ of FIG. 6. And, since quantizing errors and noise can always arise and it is desired to carry out some filter treatment, for example an averaging, of a number of samples obtained, the curve $T_{1,1}(t)$ is less suitable for establishing the total flow rate on the basis hereof than if this were done on the basis of, for example, curve $T_{3,1}(t)$.

In the case of the curve $T_{3,3}(t)$, it is actually possible to take a relatively large number of samples in the virtually linear portion, but the temperature decrease over that almost linear portion is fairly small, hence the measurement is also less accurate than when use is made of one of the other curves illustrated in FIG. 6.

From the aforesaid it appears that the content of the said chart may be considerably limited by storing only values of the most suitable curves.

Since it is not possible to store pairs of values in respect of corresponding suitable curves for all quantities of the total flow rate Φ, it will be necessary for quantities of the flow rate in respect of which no values have been stored to interpolate. Since the start portions of the curves are not precisely linear and it is not usually possible to take temperature samples for all the pipes simultaneously, this can lead to errors.

A further problem is that, if the different temperature sensors are heated to different heating end temperatures $T_h$ or if a temperature sensor is not always heated to the same heating end temperature $T_h$, cooling curves with different slopes for the same $\Phi$ or with the same slopes for different $\Phi$ may arise for each pipe. For example, in FIG. 7, three cooling curves $S_1$, $S_2$, $S_3$ are shown for a pipe, with, as heating end temperature, $T_{h1}$, $T_{h2}$ and $T_{h3}$, respectively, with $T_{h1}<T_{h2}<T_{h3}$. The curves $S_1$ and $S_2$ have the same time constant $\tau$, i.e. for these curves, the flow rate $\Phi$ through this pipe to be measured is the same and, consequently, the same total flow rate $\Phi$ must thus be established. Since the curves $S_1$ and $S_2$ at the same instants after the start of a measurement have different slopes, a correction will have to be made. Moreover, the curve $S_3$ has a greater time constant $\tau$ which means that the total flow rate $\Phi$ to be measured is greater than the total flow rate $\Phi$ which is valid for the curves $S_1$, $S_2$. Nevertheless, the curve $S_3$ has at the start of the measurement the same slope as that of the curve $S_1$, but, thereafter, the slopes are different. Since the temperature difference $T_h-T_a$ in the formula (5) represents a multiple, while the time constant $\tau$ appears in the exponent of the exponential law, it is difficult, from the measured slope of a cooling curve to derive, by division or multiplication with a factor, which flow rate $\Phi$ for this pipe belongs with this slope. If the flow rate $\Phi$ has to be established on the basis of an established slope of a cooling curve, it is therefore necessary for the temperature difference $T_h-T_a$ always to be the same.

Hereinafter, with reference to FIG. 8, and later with reference to FIG. 10 also, a first alternative method and with reference to FIG. 12 a second alternative method for determining the time constant of a cooling curve will be described, in which the problems described before, such as with reference to FIG. 7, will not occur.

According to the first of the two alternative measurement methods, during measurement of the temperature of the temperature sensor of a detection means 15, the natural logarithm of the established measurement value or the sample minus the ambient temperature is taken. For each measured curve, this leads to a virtually straight line which can be represented by:

$$y=ln(T_{i,j}(t)-T_a)$$

and, after substitution of $T_{i,j}$, (t) according to formula (5):

$$y=y_0-t/\tau \quad (6)$$

with:

$$y_0=ln(T_h-T_a) \quad (7)$$

The line represented by equation (5) thus has a slope unaffected by the heating start temperature $T_a$ and the heating end temperature $T_h$. FIG. 8 shows three such lines $y_{i,j}$ for the case of FIG. 5. Since only the slope of the lines is of importance, it is unimportant whetier the value $y_0$ is the same for the three lines and how great the relevant value thereof is. As the time constant $\tau$ becomes greater, the relevant line will approximate more closely to the horizontal line (for $\tau=\infty$) through the start value $y_0$ of the calculated line.

Figure 8:
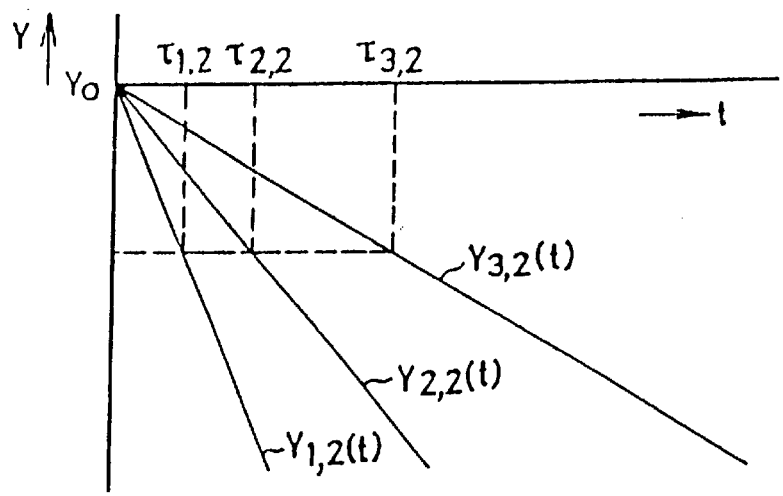
FIG. 8 shows a time diagram of lines which represent natural logarithms of cooling curves, as shown in FIG. 4 to FIG. 6 inclusive.

By taking, for each pipe, the natural logarithm of the temperature measurement values or temperature samples for different known quantities of the total flow rate $\Phi$ in the above-mentioned manner, during a calibration phase, a chart can be drawn up more easily with, for each pipe and for different values of the total flow rate $\Phi$, the corresponding time constants or values of the slope angles of lines as represented by formula (6) and shown in FIG. 8. Since the last-mentioned lines are essentially straight, it may be sufficient to have few pairs of values for each pipe and it may be easier to perform an interpolation for an accurate result. After calibration, it may also be easier, that is to say using a relatively simple rule, for a choice to be made in respect of which measurement results, that is to say originating from which pipe and after taking the natural logarithms thereof, are the most suitable for forming the basis for establishing an accurate value of the total flow rate $\Phi$.

During calibration, in all cases described (with reference to FIGS. 4–6, 8, 10, 12), for measuring the slope or the time constant of a cooling curve, the entire assembly shown in FIG. 1 or FIG. 2 is involved so that each divergence from a theoretical model or from theoretically anticipated results, as explained above, is taken into account for in the rule which is drawn up during calibration and is used thereafter for making the said choice. Consequently, as mentioned, the tolerances of the said assembly are allowed to be relatively large. This would be the case to a much lesser degree if the components of the assembly did not together form a fixed assembly.

It will be obvious that, as the number of pipes, such as the pipes inside the main pipe 10, is greater, and with a specific total flow rate $\Phi$ in the vicinity of the middle of the measurement range, for example in the case of FIG. 5, the cooling curves of more than one of such pipes may be taken so that the flow rate $\Phi$ can be established with sufficient accuracy on the basis thereof, that is to say within the requirements applying to the current application. In this case, the rule may be defined such that the cooling curves of a limited group of such pipes can always be monitored as long as the requirements of the measurement accuracy for the relevant application are complied with. The advantage of this is that the number of heating members to which energy has to be delivered can be limited, as a result of which the meter can be supplied from a supply which has a relatively small capacity and which is possibly charged by a generator which is driven by the flow medium. A further advantage is that the temperature sensors of the pipes outside the group can be used to measure the heating start temperature $T_a$. Since a measurement of Ta inside one pipe is sufficient, in the case of this pipe a pipe may be taken which, having regard to the current flow rate $\Phi$, within a specific time will be least likely to become involved in the measurement of the flow rate $\Phi$. If, for example, current pipe 21 of the assembly of FIG. 2 is used to establish the flow rate $\Phi$, the temperature $T_a$ could be measured with the temperature sensor of the pipe 25. As a result of this, the measurement of the temperature $T_a$ will be the least affected by a residual heat remaining in the relevant temperature sensor, said heat having been delivered thereto during use of the temperature sensor in establishing the flow rate $\Phi$.

As mentioned, the flow rate $\Phi$ can be established with the aid of the said rule, starting from the cooling curve of an inner pipe for which the flow rate $\Phi$ can be established with sufficient accuracy. If the flow rate $\Phi$ can, moreover, be established sufficiently accurately with another pipe, this could be done also for monitoring purposes and the rule could permit the generation of an alarm signal for a user of the meter if these two pipes were to offer substantially different measurement values of the flow rate $\Phi$. If this occurs, the meter probably has a defect, for example a completely or partially blocked inner pipe, such as pipe 14 of FIG. 1, or a passage of a restriction of FIG. 2.

Figure 9:
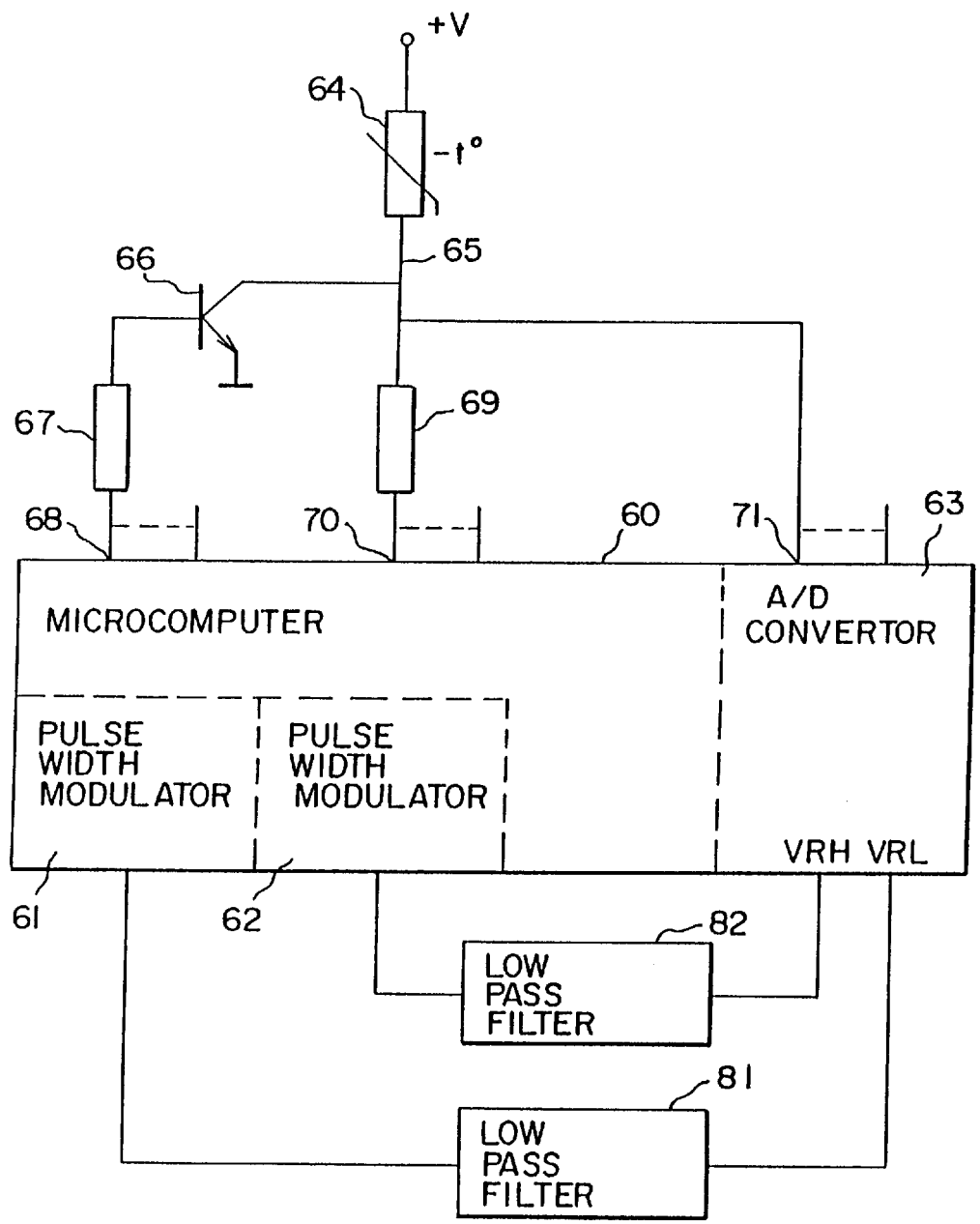
FIG. 9 shows an electrical diagram of the most important electronic part of an embodiment of a meter according to the invention.

FIG. 9 shows a diagram of the most important electronic part of a meter for application with the method according to the invention explained hereinabove. The meter comprises processing means for controlling the heating members of the detection means 15, for obtaining and processing measurement signals of the temperature sensors of the detection means 15, for using the measurement signals obtained to establish a value for the flow rate Φ through the main channel 16 of the meter, optionally for accumulating over time the amount of medium which has flowed through the main channel 16 and for outputting measurement values of the flow rate Φ and/or of the said accumulated amount of medium to the outside. Such processing means can be formed by a microcomputer 60 integrated on a single substrate, such as the microcomputer MC68HCO5B6, by Motorola, integrated on a single substrate. The microcomputer MC68HCO5B6 includes, inter alia, a central processing unit, a 176-byte random access memory (RAM), a 5952-byte read only user memory (ROM), a 255-byte electrically erasable memory (EEPROM), three gates each with eight tri-state inputs/outputs, two pulse width modulators 61 and 62 and an analog/digital converter 63 with eight selectable analog inputs. Since means for communication with the environment outside the meter are known per se and not of prime importance for the invention, these means are not shown for the simplicity of the drawings.

When the diagram of FIG. 9 is applied, each detection means 15 in a pipe 21 to 25 inclusive consists of a single member, namely a thermistor 64 with a negative temperature coefficient (NTC). One terminal of the thermistor 64 is connected to a source of positive voltage V+. The other terminal 65 of the thermistor 64 is connected to the collector of an NPN transistor 66. The emitter of the transistor 66 is connected to earth. The base of the transistor 66 is connected to a first control output 68 of the microcomputer 60 via a resistor 67. The terminal 65 of the thermistor 64 is also connected to a second control output 70 of the microcomputer 60 via a resistor 69. Moreover, the terminal 65 is connected to an analog measuring input 71 of the analog/digital converter 63. An identical group of components 64–67, 69, 71 control outputs 68 and 70 and a measurement input 71 inclusive are allocated to each of the other pipes with a detection means 15. The first and second control outputs for the various thermistors 64 can be kept continuously in the same condition (with a low voltage, a high voltage or floating), while the measurement inputs 71 for the various thermistors 64 are scanned sequentially by the converter 63, at least insofar as they are involved in a measurement.

Figure 10:
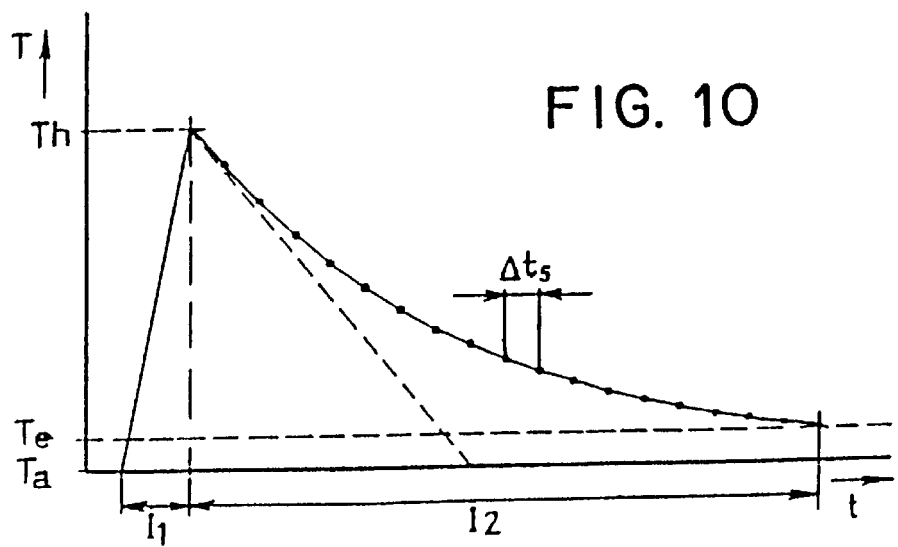
FIG. 10 shows a time diagram to illustrate the heating of a temperature sensor and the measurement of the temperature change thereof.

As shown in FIG. 10, each thermistor 64 involved in a measurement of the flow rate Φ is heated for a first interval or heating interval $I_1$, from a heating start temperature $T_a$ to a heating end temperature $T_h$. This takes place because, during the heating interval $I_1$, the microcomputer 60 increases the voltage on the first control output 68 to a high voltage and makes the second control output 70 floating. As a result of this, a relatively large current will go through the thermistor 64 and the transistor 66 and no current will go through the resistor 69. During a second interval or measurement interval $I_2$, the microcomputer 60 decreases the voltage on the first control output 68 to a low voltage, as a result of which the transistor 66 will not conduct, and the microcomputer 60 decreases the voltage on the second control output 70 to a low voltage, as a result of which only one current will pass through the thermistor 64 and the resistor 69 which in this case form a voltage divider. The value of the resistor 69 is chosen such that the current through the thermistor 64 during the measurement interval $I_2$ is relatively small, so that this does not heat the thermistor 64 substantially and, consequently, has essentially no influence on the measurement of the temperature of the thermistor 64. The node 65 of the voltage divider will the resistors 64 and 69 has, during the measurement interval $I_2$, a voltage which depends on the temperature of the thermistor 64 and, consequently, over time, on the velocity with which the medium flows along the thermistor 64 and thus also depends on the total flow rate Φ of the medium through the main channel 16.

In order to measure the temperature development curve, in particular the cooling development curve, of the thermistor 64, the analog/digital converter 63 periodically samples the voltage at the node 65 at a sampling interval $\Delta t_s$. In accordance with the aforesaid rule, or the decision algorithm or the relevant program component, the parameter values of which are stored in the said EEPROM of the microcomputer 60 during calibration of the meter, the natural logarithm is taken of each sample obtained, optionally after multiplication with a constant. This process is continued until a voltage is measured at the node 65 which corresponds to a relatively low temperature $T_e$, that is to say in the region of the start temperature or ambient temperature $T_a$ where the temperature of the thermistor, after a relatively large decrease, decreases further only at a slow rate. Not only is sufficient information already obtained in the path of the cooling curve between the high temperature $T_h$ and $T_e$ for establishing a value of the total flow rate Φ, but, also, the samples below the temperature $T_e$ are insufficiently accurate, which would be revealed in the measurement value of Φ. In the case of a greater total flow rate Φ, a thermistor will cool down more quickly and the temperature $T_e$ will be reached more quickly. This is revealed by the fact that the lines $y_{i,j}(t)$ in FIG. 8, calculated on the basis of the start point thereof, become shorter as the flow rate Φ is greater.

Because the time constant of a usable cooling curve for the smallest measurable flow rate Φ can be much greater than the time constant of the usable cooling curve for the greatest measurable flow rate Φ, the program of the microcomputer 60 preferably makes the sampling time $\Delta t_s$ greater as the flow rate Φ becomes smaller. As a result of this, sufficient samples of the voltage at the junction branching point 65, thus of the temperature of the thermistor 64, can always be taken to determine the slope of the line $y_{i,j}(t)$, as shown in FIG. 8 with filtering out of disturbing effects such as quantizing noise.

As the sampling time $\Delta t_s$ becomes greater, the duration of the measurement interval $I_2$ will become greater, in accordance therewith, as a result of which the interval at which the heating interval $I_1$, periodically occurs will also become greater, as a result of which, particularly in the case of a small flow rate Φ, unnecessary heating of a number of thermistors is prevented, as a result of which, again, electrical energy is saved and the supply can be simpler and may have a smaller capacity. If the meter is used as a natural gas meter for a household, the heating interval $I_1$ has, for example, a duration of 3 s and, at a flow rate Φ of 10 m³/h, the sampling time $\Delta t_s$ is 0,3 s and, at 0,02 m³/h, 2 s.

In order to utilize the conversion range of the analog/digital converter 63 as much as possible, a thermistor 64 to be heated is preferably always heated with essentially the same temperature difference $(T_h-T_a)$ and the low reference voltage VRL delivered to the converter 63 and a high reference voltage VRH, to which the converter 63 can convert the voltage at the junction branching point 65, are adjusted thereto. The low reference voltage VRL is, for example, adjusted to a voltage which corresponds to the previously measured heating start temperature $T_a$ minus 1° C. The high reference voltage VRH can be adjusted to a voltage at the node 65 which, for example, corresponds to the desired temperature $T_h$, plus 1° C. And, with a supply of +5 V, an NTC as thermistor 64 of the type 212ET-1 (2612 Ohm at 20° C.) and a suitable value for resistor 69, for example VRL=2,5 V and VRH=3,16 V applies. In the case of the said MC68HCO5B6 microcomputer as microcomputer 60, in which the analog/digital converter 63 is an 8-bit converter, the quantizing stage is then 2,58 mV, which corresponds to a temperature change of 0,04° C. Measurement of the heating start temperature $T_a$ preferably takes place with the aid of the temperature sensor of the detection means 15 of a pipe which, at the current flow rate $\Phi$, is not involved in the measurement of the flow rate $\Phi$. The microcomputer 60 decreases the voltage on the first control output 68 for this thermistor, therefore, constantly to a low voltage or makes it floating and decreases the voltage on the second control output 70 for this thermistor 64 also constantly to a low voltage, so that a measurement current runs constantly through the voltage divider of the thermistor 64 and the resistor 69.

The heating end temperature $T_h$ desired in the heating interval $I_1$ can always be approximately achieved fairly accurately by means of determining the resistance value of the relevant thermistor 64 at the temperature $T_a$ and, on the basis thereof, calculating the duration of the heating interval $I_1$, taking into account the decrease in the resistance of the thermistor (NTC) 64 during heating.

If the relevant program part of the microcomputer has determined the temperatures $T_a$ and $T_h$, it controls the pulse width modulators 61 and 62 allocated thereto in order to deliver a square-wave voltage, the pulse duration or power factor of which depends on the relevant temperature. The output voltages of the pulse width modulators 61 and 62 are delivered via a corresponding low pass filter 81 or 82, respectively, to the control input VRL or the control input for VRH, respectively, of the converter 63. The low pass filters 81 and 82 each consist, for example, of a series of integrators, for example three, each having a resistor and a capacitor. As the pulse duration or power factor of a voltage delivered to a low pass filter 81, 82 increases, the output voltage of the filter 81, 82 will become higher. As the pulse duration becomes shorter, the last-mentioned voltage will become lower. The frequency of the output voltages of the modulators 61 and 62 can be fixed and can, in the case of the MC68HCO5B6 microcomputer 60 be derived from a crystal oscillator present on the single substrate and can, for example, be divided to, for example, 1982 Hz.

The said type of thermistor 212ET-1 has a diameter of less than 1,25 mm which, for application in a natural gas meter for a household, is so small that any interfering effect on the flow medium and therefore on the measurement of the flow rate $\Phi$, resulting from the Measurements, can be compensated for by calibration in order, after calibration, to be eliminated. The said type of NTC can be purchased for under 0,75 guilders. The most important electronic component, particularly the said MC68HCO5B6 microcomputer 60 can be purchased for under 7 guilders. As already stated, the assembly shown in FIG. 1 or FIG. 2 can be manufactured simply by means of injection-moulding and with relatively large tolerances. As explained, calibration can take place relatively simply, without the use of specific temperatures of a test gas. Using all these factors, a meter according to the invention can be manufactured inexpensively. Owing to the absence of moving parts, the meter is, moreover, robust and not susceptible to wear and displacement of such moving parts. Nevertheless, the meter is suitable for dynamically measuring the total flow rate $\Phi$ accurately and within a wide range.

Figure 7:
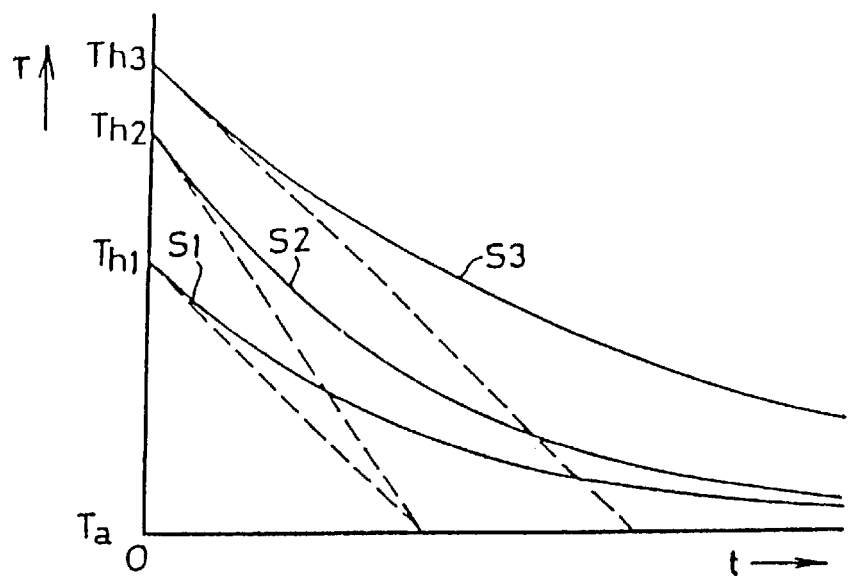
FIG. 7 shows a time diagram of cooling curves to clarify the processing of measurement signals originating from temperature sensors.
Figure 11:
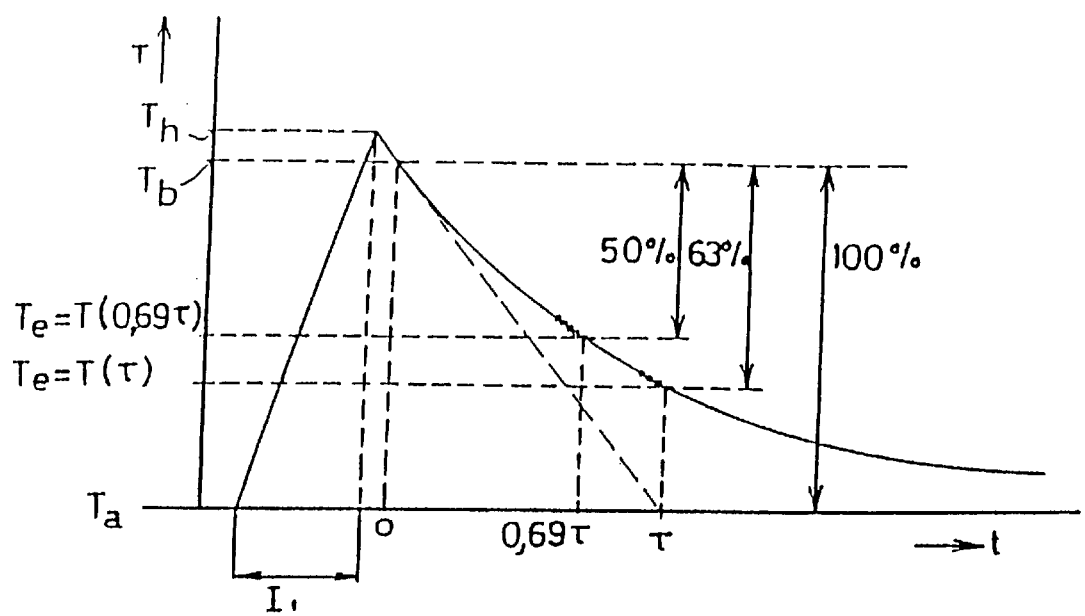
FIG. 11 shows a time diagram to illustrate the heating of a temperature sensor and a further method of measuring the temperature change thereof.

The second alternative method (third Method) for determining the time constant of a cooling curve for eliminating the problems illustrated with reference to FIG. 7 will now be illustrated with reference to FIG. 11. After the first interval $I_1$ has elapsed, the detection means 15 is heated to the heating end temperature $T_h$. After hearing of the detection means 15, the temperature at the measurement site is measured. This temperature is called the start measurement temperature $T_b$. The start measurement temperature $T_b$ may be identical or virtually identical to the heating end temperature $T_h$. The temperature difference $\Delta T=T_b-T_a$ is established. This temperature difference is multiplied by a reduction factor k. An end measurement temperature $T_e$ is calculated according to the relationship $T_e=T_b-k\Delta T$. If a clock is started at the instant when the start measurement temperature $T_b$ is measured and if the reduction factor is, for example, 0,63, the calculated end measurement temperature $T_e$ would be reached at the instant that the clock has measured a time identical to the time constant $\tau$. This measured time $t=\tau$ therefore indicates the time constant of the cooling curve. For determining the time constant $\tau$ it is irrelevant at what instant in the second interval the start measurement temperature $T_b$ is measured and the clock is started. The measurement of time will, however, be more accurate the more the relatively high temperature difference $T_h-T_a$ is utilized. The established time constant may be processed in the same way as illustrated above.

Each factor with which a sufficient measurement accuracy can be achieved may be used for the temperature reduction factor. For, for example, a reduction factor of 0,5, the corresponding end measurement temperature $T_e$ is achieved at a measured time $t=0,69\ \tau$. Subsequently, the measured time t associated with reaching the end measurement temperature $T_e$ may be used, if desired, to calculate the time constant $\tau$ (in the last example, $\tau=t/0,69$). The aforementioned calibration table may, however, for the last example, comprise values of $0,69\ \tau$ instead of $\tau$.

Figure 12:
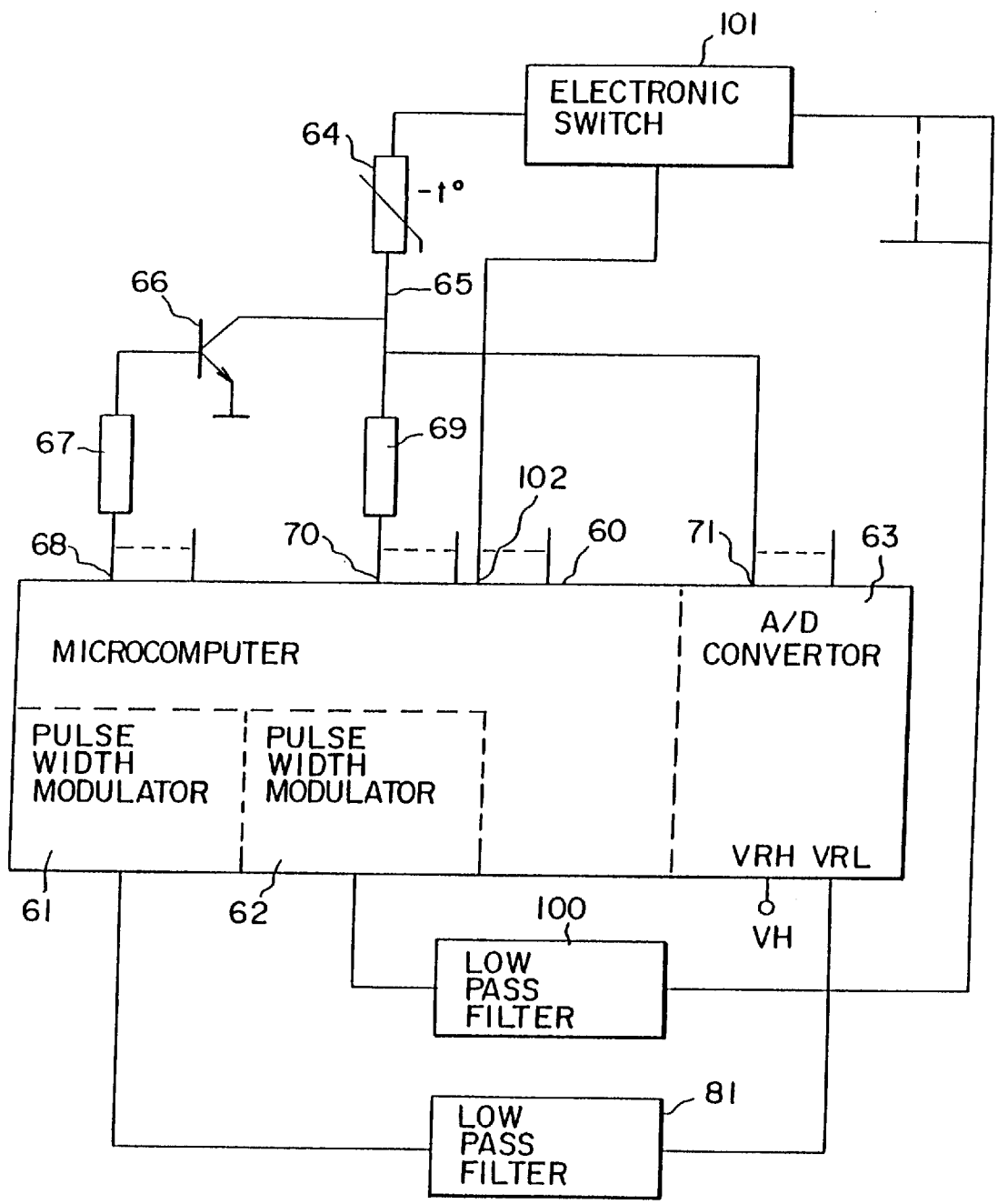
FIG. 12 shows an electrical diagram of the most important electronic part of a further embodiment of a meter according to the invention.

The two examples illustrated with k=0,63 and k=0,5 are shown in FIG. 12 with the figures 63% or 50%, respectively, while $\Delta T$ represents 100%. The reduction factor preferably lies between 0,3 and 0,8. The reduction factors may be different for different measurement sites and may, moreover, be applied dynamically as a function of the conditions.

After the end measurement temperature $T_e$ has been reached, the flow measurement for the measurement site involved is completed and the measured time can be processed. Whenever, at the start of a subsequent measurement cycle, starting with a first interval $I_1$, there is still a residual heat originating from the previous flow measurement at the measurement site, particularly in the detection means 15, this has, just as in the first alternative method (illustrated with reference to FIGS. 8 and 10) no effect on the slope or the time constant of the cooling curve.

When the heating member and the temperature sensor at a measurement site are formed by a single thermistor as detection means 15, an electric current which will heat the thermistor will flow through the thermistor during measurement of the temperature of the thermistor, which adversely affects the measurement accuracy. Therefore, the electric measurement current through the thermistor will be kept as small as possible. The accuracy may be further improved by, on the basis of earlier measurements, estimating the time when the calculated end measurement temperature $T_e$ will be achieved and by measuring only the start measurement $T_b$ and by measuring the temperature of the thermistor starting only shortly before reaching the estimated instant when the end measurement temperature $T_e$ will be achieved. As a result of this, the thermistor is heated by the measurement current as little as possible during cooling. After what length of time following measurement of the start measurement temperature $T_b$ the temperature has to be measured again depends on the dynamics of the medium flow, the desired accuracy, the slope at the end measurement temperature $T_e$ and the number of measurement sites for which a flow measurement is carried out. For a gas meter for household use, starting from the measurement of the start measurement temperature $T_b$, the time during which the temperature is not measured can be at least 80% of the estimated time for reaching the end measurement temperature $T_e$.

If the detection means 15 in the embodiments of the invention illustrated above is a thermistor, the thermistor is periodically subject to relatively large temperature fluctuations (up to approximately 15° C.). This can lead to the thermistor ageing more quickly, as a result of which the temperature-resistance characteristic thereof alters so much that the initial measurement accuracy of the relevant measurement site is not maintained by this thermistor. This problem may be solved as follows: an auxiliary thermistor is fitted which is identical to a thermistor with which a flow measurement is carried out at a measurement site. The auxiliary thermistor is used only for making temperature measurements so that only a small electric current goes through the auxiliary thermistor, with the result that it ages more slowly than the thermistor with which a flow measurement is carried out. Preferably, the temperature of the auxiliary thermistor is measured only periodically and for a short time, for example 1 ms, as a result of which ageing of the auxiliary thermistor will be minimal. Periodically, and at instants when the thermistor with which the flow measurements are carried out has cooled to the ambient temperature $T_a$, the temperature of this thermistor is measured, preferably virtually simultaneously with the measurement of the temperature of the auxiliary thermistor, and a difference between the two measured temperature values of these two thermistors at that instant is used for calibrating the measurement values of the thermistor with which the flow measurements are carried out, the auxiliary thermistor being used as reference thermistor. Since this can take place regularly, a calibration table can be drawn up and updated continuously for each thermistor with which flow measurements are carried out. If the properties of the thermistors of a measurement site do not differ too much, it may even be sufficient to establish such tables only during the use of the flow meter. The cost price of a flow meter according to the invention can consequently be substantially limited.

Although not shown, the auxiliary thermistor is preferably fitted upstream of the thermistors with which flow measurements are carried out, as a result of which the temperature of the auxiliary thermistor is not affected by heating of one or more of the other thermistors. Preferably, each measurement site has its own auxiliary thermistor at a short distance upstream from the other thermistor of the measurement site, as a result of which an even more accurate calibration can take place and a thermistor with the most suitable temperature-resistance characteristic for a specific range of the flow velocity of the medium can be chosen for each measurement site.

In the case of all the methods illustrated above for determining the time constant of a cooling curve, the following interpolation formula can be used for calculating the flow rate with a measured tome constant:

$$Q = Q1 * (Q2/Q1)^{(\tau1-\tau)/(\tau1-\tau2)} \quad [m^3/h]$$

in which:

Q=the flow rate to be calculated [m³/h]

$\tau$=measured time constant [s]

$Q1, \tau1$=first calibration pair of flow rate and time constant with $\tau1 > \tau$ $(Q2, \tau2)$=second calibration pair with $\tau1 > \tau > \tau2$ It was found that the measurement accuracy may be further increased if the drain of heat to connecting wires of the detection means 15 (thermistor 64 in FIG. 9) during the first interval and to the housing in which the detection means 15 is fitted and for the flowing back of a portion of this heat during the second interval I2 to the detection means 15 are taken into account. According to the invention, this is achieved by allowing all first intervals $I_1$, for each measurement site, to have a fixed duration and by allowing the heating to take place, in all first intervals $I_1$, with the same development curve. In order to achieve this, the diagram shown in FIG. 9 is modified to a diagram as shown in FIG. 12. In FIG. 12, the reference input VRH for the high reference voltage of A/D converter 63 receives a fixed reference voltage VH of 3,16 V. The output of the pulse width modulator 62 is now connected to a low pass filter 100, the construction of which may be identical to the low pass filters 81 and 82 in FIG. 9. The output of the low pass filter 100 is connected to an input of an electronic switch 101. The connection of the thermistor 64, which in the diagram of FIG. 9 receives a fixed voltage +V, is, in the diagram of FIG. 12, connected to the output of the electronic switch 101. A control input of the electronic switch 101 is connected to a control output 102 of the microcomputer 60. An electronic switch, such as the electronic switch 101, is provided for each measurement site (with a corresponding thermistor 64), and receives a control signal from an associated control output, such as the control output 102, of the microcomputer 60. Prior to the heating of a measurement site, the microcomputer 60 calculates on the basis of the measured ambient temperature $T_a$ and/or the temperature of the thermistor 64 a desired temperature difference and a fixed duration of the first interval $I_1$, the number, the width and the distribution of a number of pulses, which the microcomputer 60 generates and delivers to the thermistor 64 via the pulse width modulator 62, the low pass filter 100 and the electronic switch 101. The voltage at the output of the electronic switch 101 is approximately a direct voltage.

The pulse width modulator 62 and the low pass filter 100 are used jointly for all measurement sites. Since, through the use of multiplexing, only one measurement site is heated at a time, the microcomputer 60 opens only one electronic switch 101 at a time and it closes this switch 101 again exactly at the end of the first interval $I_1$ for the measurement site in question.

Of course, it is possible, in the alternative embodiment of FIG. 12, to supply the reference input VRH of the A/D converter 63 with a reference voltage in the manner illustrated with reference to FIG. 9.

Figure 13:
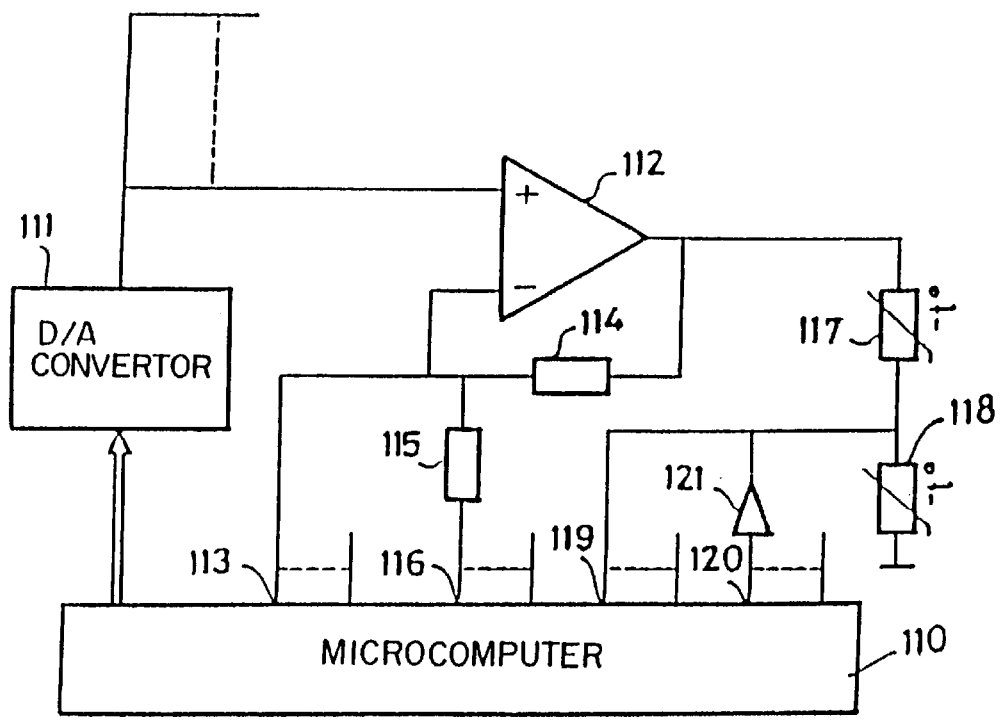
FIG. 13 shows a further electrical diagram of the most important electronic part of a stil further embodiment of a meter according to the invention.

FIG. 13 shows the diagram of the most important electronic portion of a further embodiment of a flow meter according to the Invention. The diagram in FIG. 13 comprises a microcomputer 110 and a D/A converter 111, which are the only components in the diagram of FIG. 13 common to all measurement sites. The D/A converter 111 receives a digital value from the microcomputer 110 and delivers, to an output thereof, an analog voltage corresponding thereto.

For each measurement site, the diagram in FIG. 13 comprises an operational amplifier 12, a non-inverting input of which is connected to the output of the converter 111 and an inverting input of which is connected to a terminal 113 of the microcomputer 110. A resistor 114 is connected between the output and the inverting input of the amplifier 112. The inverting input of the amplifier 112 is also connected to a terminal 116 of the microcomputer 110 via a resistor 115. The output of the amplifier 112 is connected to earth via a series connection of a first thermistor 117 and a second thermistor 118. The node of the two thermistors 117, 118 is connected to an input 119 of an A/D converter of the microcomputer 110. An output 120 of the microcomputer 110 is connected to the node of the thermistors 117, 118 via a buffer 121.

Both thermistors 117 and 118 are fitted at the measurement site, thermistor 118 being located upstream of thermistor 117. Thermistor 117 is heated during the firstmentioned first intervals I1 a relatively high first electric current being conveyed through the thermistor 117 and no current being conveyed through the thermistor 118. During measurement, a relatively small second electric current is conveyed through both thermistors 117 and 118.

If the microcomputer 110 has not chosen the measurement site for carrying out the a flow measurement, the microcomputer 110 delivers a high voltage to terminal 113, as a result of which the output of the amplifier 112 becomes low, as a result of which no current passes through the thermistors 117 and 118, as a result of which the thermistors are not heated unnecessarily and ageing resulting from heating is counteracted.

If the microcomputer 110 has chosen a measurement site for carrying out a flow measurement and the voltage at the input 119 of the microcomputer 110 has to be measured, the microcomputer 110 controls terminals 113, 116 and 120 to a high impedance and the computer delivers, to the D/A converter 111, a digital value which, at the output of the converter 111, delivers a relatively low voltage, for example 5 v. Since the amplifier 112 is, in this situation, connected as a voltage follower, the voltage at the output of the converter 111. The computer 110 measures the voltage at the node of the thermistors 117 and 118 at the input 119. If the thermistors 117 and 118 are completely identical and the temperature of both thermistors 117, 118 is identical, the voltage at the input 119 will be half the output voltage of the D/A converter 111. If the thermistors are not identical, a correction may be made to the measurement value in a manner as explained earlier, namely on the basis of a calibration table which may be continuously updated. The voltage measured at the input 119 in this situation may be interpreted as the temperature at the measurement site. In the diagram of FIG. 13, it is, however, never necessary to convert the voltage measured at the node of the thermistors 117, 118 to a temperature value or to process it as a temperature value.

The microcomputer 110 heats a measurement site for which a flow measurement has to be carried out in each case for a first interval $I_1$ with a fixed time, for example, of 2.5 s. The first interval is divided into subintervals, for example 25 of 100 ms each. During each subinterval, the microcomputer 110 can deliver a number of pulses, for example normally five and, as a maximum, ten of 10 ms each, to the D/A converter 111. Consecutive pulses may in this case be active during essentially the entire period thereof up to the following pulse. During the first interval $I_1$, the computer 110 delivers the pulses in the form of a series of consecutive digital values to the D/A converter 111. For heating, the computer 110 controls terminal 113 to a high impedance during the first interval $I_1$ and the computer 110 controls terminals 116 and 120 to a low impedance. If, for example, resistor 114 has a value of 3 kOhm and resistor 115 has a value of 1 kOhm, the output voltage of the D/A converter 111 to the output of the amplifier 112 is as a result amplified by an amplification factor 4. In this case, the amplifier 112 passes a relatively large current through the thermistor 117 and the buffer 121 and no current goes through the thermistor 118.

In the first interval $I_1$ the computer 110 periodically, for example every 10 ms, and in each case for only, for example, 1 ms, measures the voltage at the node of the thermistors 117, 118 in the manner illustrated above, the amplifier 112 being connected as a voltage follower (terminals 113, 116 and 120 having a high impedance) and a relatively low current going through both thermistors 117 and 118. In the second interval $I_2$, the voltage at the node of the thermistors 117, 118 is measured in the same manner.

Prior to the first interval $I_1$, the computer 110 calculates on the basis of the initially measured voltage ("ambient temperature") and a desired voltage difference across the thermistor 117 at the end of the first interval $I_1$ a predetermined distribution of the pulses over the first interval $I_1$. On the basis of the voltage at the node of the thermistors 117 and 118 measured periodically during the first interval $I_1$, the computer 110 may or may not adjust the distribution of the pulses and may or may not alter the amplitude of the pulses at the end of each subinterval of 100 ms by changing the input value of the active part of the pulses to the D/A converter 111. The computer 110 is programmed to keep the curve of the heating of the thermistor 117 during each first interval $I_1$ essentially identical. The aim is also, for example, for the measured voltage at the node of the thermistors 117 and 118 to be (virtually) equal to VH (=3,16 V) at the start of each second interval $I_2$.

During the second interval $I_2$, the voltage measured at the node of the thermistors 117 and 118 may be processed in the same manner as illustrated above for the other embodiments, as if the measured voltage represents a temperature.

Since the voltage divider connected to the output of the amplifier 112 consists of two essentially identical thermistors and the thermistors are subject to the same ambient temperature, for a large range of the ambient temperature the resistance values will lie closer together than in the case where a fixed resistance was taken for thermistor 118. The resolution and the accuracy of the measurement will consequently also be better. For the same purpose, the resistors 69 in FIGS. 9 and 12 may also be thermistors which are essentially identical to the thermistors 64.

All embodiments have the important advantage that a "solid-state" apparatus is achieved which is suitable for measuring the flow rate of a medium flow through the apparatus over a wide measurement range and with great accuracy.

I claim:

1. Method for measuring the flow rate of a medium, comprising provision of at least one measurement site in the flow of the medium, each measurement site having an electronic detection means (15), heating the detection means (15) during a first period ($I_1$) by an electric heating current from an ambient temperature ($T_a$) to a heating and temperature ($T_h$), removing the heating current and having the detection means (15) cooled down during a second period ($I_2$) subsequent to the first period ($I_1$), measuring an electrical parameter which is dependent on the temperature (T) of the detection means (15) by feeding an electric measuring current through the detection means (15) and determining a value for the flow rate using a predetermined rule based on cooling curves of the detection means and measured values of the electrical parameter during the second period ($I_2$), and alternately heating and cooling respectively the detection means (15) and determining a value for the flow rate during each second period ($I_2$), while the first periods ($I_1$) have identical durations, characterized in that the measurement sites are arranged so as to subject the detection means (15) continuously to the flow of the medium and with different flow velocities at different measurement sites for any total flow rate, before determining a value for the flow rate the predetermined rule is provided with measurement range information for each site, dependent on a previous measurement of the flow rate a group of one to all measurements sites is selected such that the group provides contiguous measurement range, for each site of the group of sites there is determined a provisional value of the flow rate, and on basis of the measurement range information the predetermined rule selects one provisional value with the highest measurement accuracy from the provisional values determined for said group of sites, the selected provisional value representing a final measurement value for the flow rate sought for until its renewal by a next selection from provisional values, while the group of sites is selected also to incorporate the measurement site associated with the final measurement value selected just before, and the heating of a detection means (15) is performed with substantially identical development curves of the electrical parameter for all first periods ($I_1$).

2. Method according to claim 1 characterized in that the electric heating current is comprised of pulses, between pulses of the heating current the electrical parameter is measured, and the pulses are generated with controlling of at least one variable out of a number, a distribution and an intensity of the pulses, such to approximate the development curve of values of the electrical parameter to a reference development curve.

3. Method according to claim 1, in which the detection means (15) is arranged in a voltage divider (64,69; 117,118), when measuring the electrical parameter the measuring current is fed through the divider, and at a node of the divider a signal is derived which represents the electrical parameter, characterized in that upstream the detection means (15) of each site there is arranged another, identical detection means in the medium flow, and when measuring the electrical parameter associated with a measurement site the upstream detection means is incorporated in the divider associated with the measurement site.

4. Method according to claim 1 characterized in that a difference is determined between the last selected final measurement value associated with a measurement site and the provisional value associated with another measurement site of the group of measurement sites, the measurement sites associated with measurement values to be compared having accuracy ranges closest to each other, and a warning message is generated if the difference exceeds a predetermined value.

5. Method according to claim 1 characterized in that the ambient temperature is measured by a detection means (15) of a measurement site for which currently no flow measurement is carried out.

6. Method according to claim 1, characterized in that the ambient temperature is measured by a temperature sensor upstream of the selected group of measurement sites in the flow.

7. Method according to claim 1 characterized in that the provisional value of the rate of flow is determined based on the slope of an essentially linear start portion of the development of the electrical parameter during the second period ($I_2$).

8. Method according to claim 1 characterized in that during the second interval ($I_2$) successive samples of the electrical parameter are taken, the natural logarithm of each sample value is taken, and the provisional value of the rate of flow is determined based on the slope of the Logarithm values taken from the successive samples.

9. Method according to claim 1 inclusive, in which during the second period ($I_2$) the time is measured between the occurrence of a first value of the electrical parameter and a subsequent second value of the electrical parameter, the first and second values of the electrical parameter being predetermined and dependent on the ambient temperature, and a value of the flow rate is determined based on the measured time, characterized in that prior to the measurement the time to be measured is estimated on the basis of measurements of said time measured during one or more preceding second periods ($I_2$), and in the current second period ($I_2$) after measurement of the first value of the electrical parameter measurement forthgoing of the measurement is held up until the estimated time has almost elapsed.

10. Method according to claim 9 characterized in that the measurement is held up for at least 80% of the estimated time.

11. Method according to claim 1 characterized in that at each measurement site there is arranged a reference detection means which is identical to the first said detection means (15) of said site, at times when the measurement site is not a site of the selected group of measurement sites the ambient temperature is measured by both detection means of the site, a difference between the values measured by both detection means is determined, and dependent on said difference measurement values obtained from the first said detection means are calibrated.

12. Method according to claim 1 characterized in that during a calibration phase for each measurement site and for each of several different calibration flow rates a value of the electrical parameter is measured and stored as a pair with the current flow rate value to establish the predetermined rule, and after the calibration phase a value of the flow rate at a measurement site is calculated by interpolation from stored pairs of values associated with said site.

13. Apparatus for measuring the flow rate of a medium, comprising a device (10), through which a medium is flowed and an electronic control and measurement circuit, the device (10) having a flow channel (16) with an inlet and an outlet for allowing passage of the medium, a number of measurement sites arranged in the channel (16), each measurement site having a detection means (15) capable of being heated by a heating current provided by the electronic circuit during first periods ($I_1$) and for supplying a measurement current provided by the electronic circuit during second periods ($I_2$) which alternate with the first periods (I1), when feeding the measurement current through the detection means (15) the detection means providing a measurement signal which represents an electrical parameter which is dependent on the temperature of the detection means (15), and the electronic circuit determining a flow rate value dependent on a predetermined rule based on cooling curves of the detection means and measured values of the electrical parameter during the second period ($I_2$,) characterized in that the detection means (15) are located at measurement sites having different flow velocities for any total flow rate, the electronic circuit comprises pulse generating means, which generate a series of pulses during each first period ($I_1$), the series of pulses providing the heating current, the electronic circuit measures the electrical parameter between pulses, and the generating means generates the pulses with controlling of at least one variable out of a number, a distribution and an intensity of the pulses, such to approximate a development curve of measured values of the electrical parameter to a reference development curve which is substantially identical for all periods ($I_1$).

14. Apparatus according to claim 13, in which the detection means (15) is connected in a voltage divider (64,69; 117,118) a node of the divider providing the measurement signal, characterized in that the voltage divider comprises another detection means (69; 118), which is identical to and which is arranged upstream of the first said detection means (64; 117) in the flow of the medium.

15. Apparatus according to claim 14 characterized in that both detection means of the voltage divider are thermistors (117,118).

16. Apparatus according to claim 13 characterized in that the channel (16) comprises a number of parallel subchannels (17, 18, 19; 26, 27, 28, 29, 30), in each subchannel there is arranged a measurement site, and the subchannels being arranged to provide different velocities of the medium at the respective measurement sites for any total flow rate.

17. Apparatus according to claim 16 characterized in that each subchannel (26, 27, 28, 29, 30) comprises a restriction (31, 32, 33, 34, 35), the flow areas of the subchannels and restrictions being such to provide different velocities of the medium of the respective measurement sites for any total flow rate.

* * * * *